US007760086B2

(12) United States Patent
Hunter et al.

(10) Patent No.: US 7,760,086 B2
(45) Date of Patent: Jul. 20, 2010

(54) TAMPER RESPONDENT SENSOR AND ENCLOSURE

(75) Inventors: Steve B. Hunter, Kinross (GB); John A Voltz, Hockessin, DE (US); Brent W. Lewis, Middletown, DE (US); Harold S. Wylie, Elkton, MD (US)

(73) Assignee: Gore Enterprise Holdings, Inc, Newark, DE (US)

( * ) Notice: Subject to any disclaimer, the term of this patent is extended or adjusted under 35 U.S.C. 154(b) by 460 days.

(21) Appl. No.: 11/592,766

(22) Filed: Nov. 3, 2006

(65) Prior Publication Data
US 2008/0106400 A1 May 8, 2008

(51) Int. Cl.
*G08B 21/00* (2006.01)
(52) U.S. Cl. .................... 340/540; 340/568.1
(58) Field of Classification Search ................. 340/653, 340/635, 637, 568.1, 657, 540, 590, 545.6, 340/571, 550; 361/45; 324/110, 142
See application file for complete search history.

(56) References Cited

U.S. PATENT DOCUMENTS

| | | | | |
|---|---|---|---|---|
| 3,644,825 | A | 2/1972 | Davis, Jr. ..................... | 324/41 |
| 4,188,549 | A | 2/1980 | Dorais ........................ | 307/308 |
| 4,325,089 | A | 4/1982 | Hsu ............................ | 360/15 |
| 4,593,384 | A | 6/1986 | Kleijne ....................... | 365/228 |
| 5,832,772 | A | 11/1998 | McEwan ..................... | 73/290 |
| 5,858,500 | A | 1/1999 | MacPherson ................ | 428/68 |
| 5,910,774 | A | 6/1999 | Capriotti et al. ............ | 340/637 |
| 6,396,400 | B1 | 5/2002 | Epstein ....................... | 340/550 |
| 6,400,268 | B1 | 6/2002 | Lindskog .................... | 340/550 |
| 6,496,119 | B1 | 12/2002 | Otterstedt et al. ........... | 340/653 |
| 6,606,123 | B2 | 8/2003 | Mizuno ...................... | 348/308 |
| 6,686,539 | B2 * | 2/2004 | Farquhar et al. ............ | 174/525 |
| 6,982,642 | B1 * | 1/2006 | Cesana et al. ............... | 340/550 |
| 6,996,953 | B2 * | 2/2006 | Perreault et al. ............. | 53/449 |
| 7,054,162 | B2 * | 5/2006 | Benson et al. .............. | 361/760 |
| 2002/0002683 | A1 | 1/2002 | Benson ....................... | 361/760 |
| 2002/0092672 | A1 | 7/2002 | Primavera ................... | 174/250 |
| 2002/0171439 | A1 | 11/2002 | Ono ............................ | 324/658 |
| 2006/0049941 | A1 | 3/2006 | Hunter ..................... | 340/545.6 |
| 2006/0163349 | A1 | 7/2006 | Neugebauer ................ | 235/383 |

FOREIGN PATENT DOCUMENTS

| | | | |
|---|---|---|---|
| DE | 197 38 990 A1 | 3/1999 |
| EP | 1 462 907 A | 9/2004 |
| FR | 2 801 999 A | 6/2001 |
| GB | 2 220 513 A | 1/1990 |
| GB | 2 256 956 A | 12/1992 |
| GB | 2 256 957 A | 12/1992 |

(Continued)

*Primary Examiner*—Anh V La
(74) *Attorney, Agent, or Firm*—Allan M. Wheatcraft

(57) ABSTRACT

A tamper respondent enclosure including (a) a circuit board; (b) an enclosure surrounding the circuit board; (c) a tamper respondent sensor having (i) a substrate with first and second sides; (ii) a first layer of conductive traces on the first side; (d) wherein the tamper respondent sensor is wrapped around the enclosure with at least one overlap region; and (e) wherein only at the at least one overlap region the tamper respondent sensor has a second layer of conductive traces on the second side. Preferably, the substrate is insulating and made of opaque PET, and the first layer is adjacent the enclosure.

25 Claims, 7 Drawing Sheets

FOREIGN PATENT DOCUMENTS

| | | |
|---|---|---|
| GB | 2 256 958 A | 12/1992 |
| GB | 2 258 075 A | 1/1993 |
| GB | 2 270 785 A | 3/1994 |
| GB | 2356 276 | 5/2001 |
| WO | WO 99/21142 | 4/1999 |
| WO | WO 01/59544 A2 | 8/2001 |
| WO | WO/2005/098950 A1 | 4/2005 |

* cited by examiner

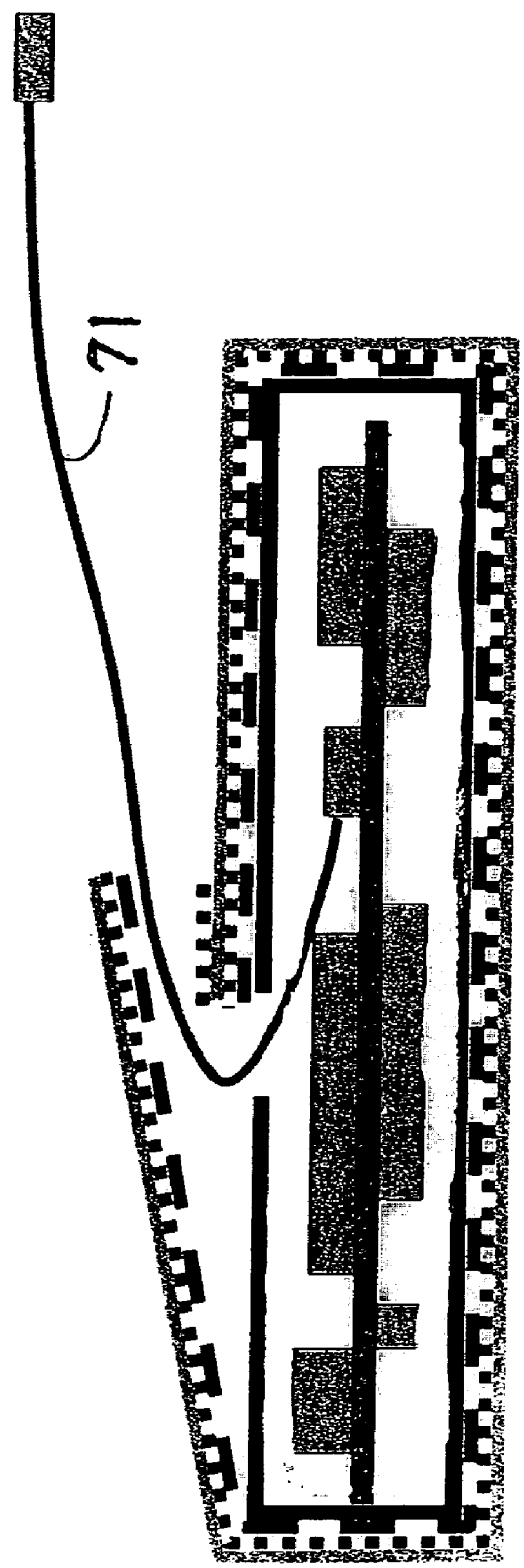

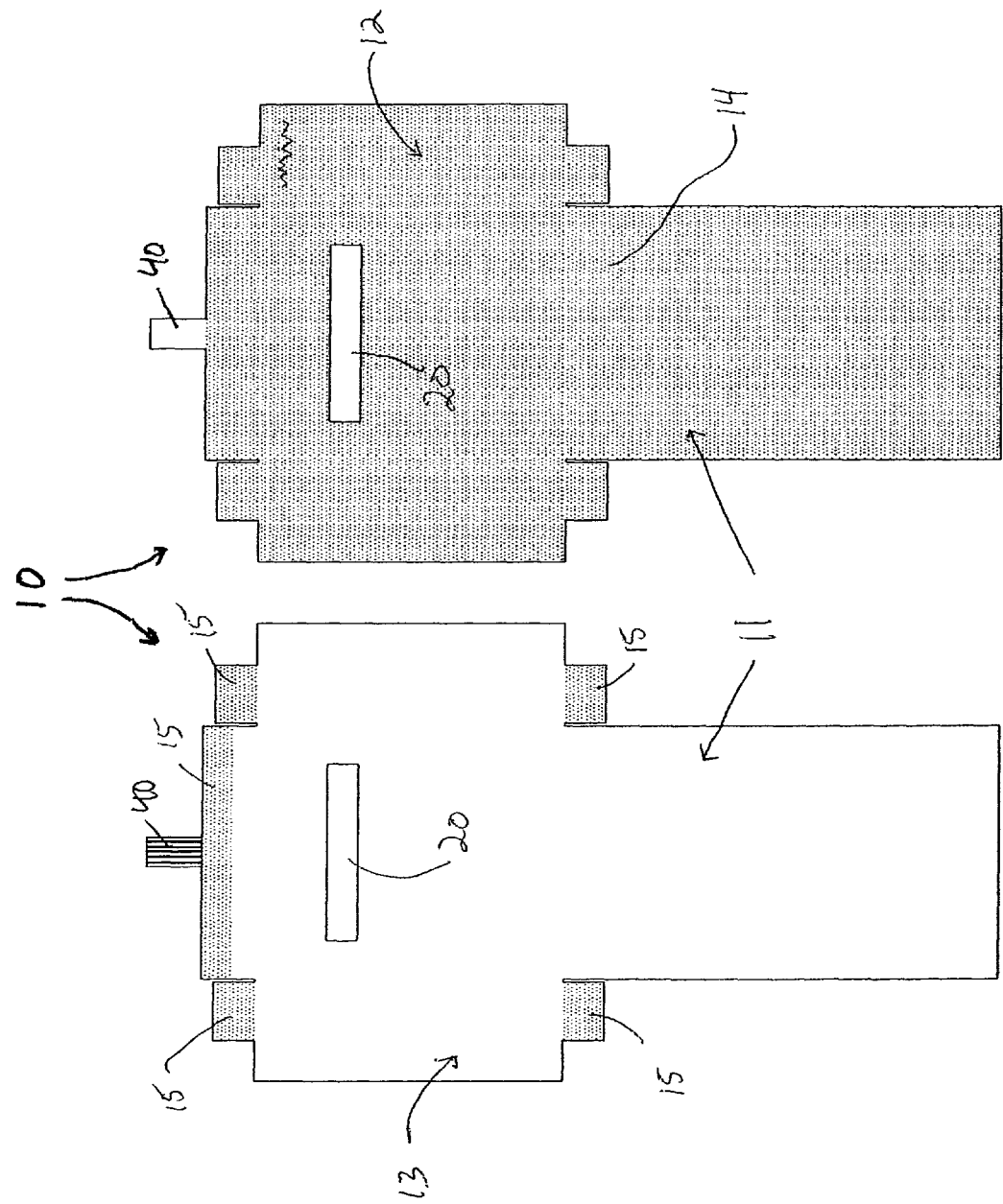

TAMPER RESPONDENT SENSOR AND ENCLOSURE

FIELD OF THE INVENTION

This invention relates to tamper respondent enclosures, and in particular, to a sensor used as a tamper respondent enclosure.

BACKGROUND OF THE INVENTION

Tamper respondent enclosures are used in various applications, including the transport of sensitive information and protecting electronic devices. Typical enclosures are in the form of envelopes and shallow boxes, the walls of which are formed by folding flexible sheets incorporating tamper detection features. As used herein, sheets incorporating tamper detection features are known as "sensors". These sheets may also be wrapped around preexisting boxes or enclosures.

Included in such sheets are layers of flexible material and a matrix of diagonally extending or zig-zag pattern semi-conductive or conductive lines, also known as conductive traces. The lines or traces are printed on thin insulating film. The matrix of lines forms a continuous conductor which is broken if attempts are made to penetrate the film. The sensor matrix is monitored and when a tamper occurs the electrical state of the sensor changes. A detection of a change in state can initiate a signal. This signal can erase information stored within the enclosure, or otherwise protect the information from being discovered.

In known devices, the matrix of semi-conductive or conductive lines or traces on the insulating film is printed on both sides of the film. The lines on one side are disposed in the sections of the film opposite from where the lines are disposed on the opposite side. In this manner, complete coverage of the film is obtained, and it is more difficult to penetrate the film without cutting a line, either on one side of the film or the other.

Typically, the flexible material is a clear insulating film such as PET. In order to further protect and obfuscate the location of the lines of the semi-conductive lines, thereby making it more difficult to circumvent them in an attempt to break through the film to get to the information, known methods include a potting material. This potting material is typically a dark resin that encapsulates the entire film. The dark potting material provides a mechanical barrier and hides the location of the semi-conductive lines.

Although these devices are effective, they are difficult to manufacture. A construction that leads to a more efficient assembly is desired.

SUMMARY OF THE INVENTION

The present invention provides a tamper respondent enclosure including (a) a circuit board; (b) an enclosure surrounding the circuit board; (c) a tamper respondent sensor having (i) a substrate with first and second sides; (ii) a first layer of conductive traces on the first side; (d) wherein the tamper respondent sensor is wrapped around the enclosure with at least one overlap region; and (e) wherein only at the at least one overlap region the tamper respondent sensor has a second layer of conductive traces on the second side. Preferably, the substrate is insulating and made of an opaque film such as PET, and the first layer is adjacent the enclosure.

In alternative embodiments, the substrate and enclosure further include an opening for communication between the circuit board and an external device. In exemplary embodiments, the external device is a computer mother board, a connector, and a cable. The circuit board in an alternative embodiment includes a wireless transmitter.

In preferred embodiments, the tamper respondent sensor is shaped to allow only two layers at the at least one overlap region, and the second side of said substrate has no exposed conductive traces. Also in a preferred embodiment, the substrate further includes an adhesive disposed over the first layer of conductive traces. The adhesive is preferably a pressure sensitive adhesive (PSA).

In another aspect, the present invention provides a tamper respondent sensor including (a) a substrate having a first side and a second side, the substrate adapted to be folded to produce an overlapping portion of the first side with an overlapping portion of the second side; (b) a first layer of conductive traces on the first side; (c) a second layer of conductive traces only at the overlapping portion of the second side, (d) the second side having a region free of conductive traces, (e) the second layer of conductive traces being electrically connected to the first layer of conductive traces. Preferably, the traces are in an unpredictable pattern. The tamper respondent sensor preferably further includes an input/output (I/O) lead.

DESCRIPTION OF THE DRAWINGS

FIG. 2B is a schematic side sectional view of a sensor according to an exemplary embodiment of the present invention.

FIG. 4A is a bottom view of an exemplary sensor according to the present invention.

FIG. 4B is a top view of an exemplary sensor according to the present invention.

DETAILED DESCRIPTION OF THE INVENTION

Figure 1:
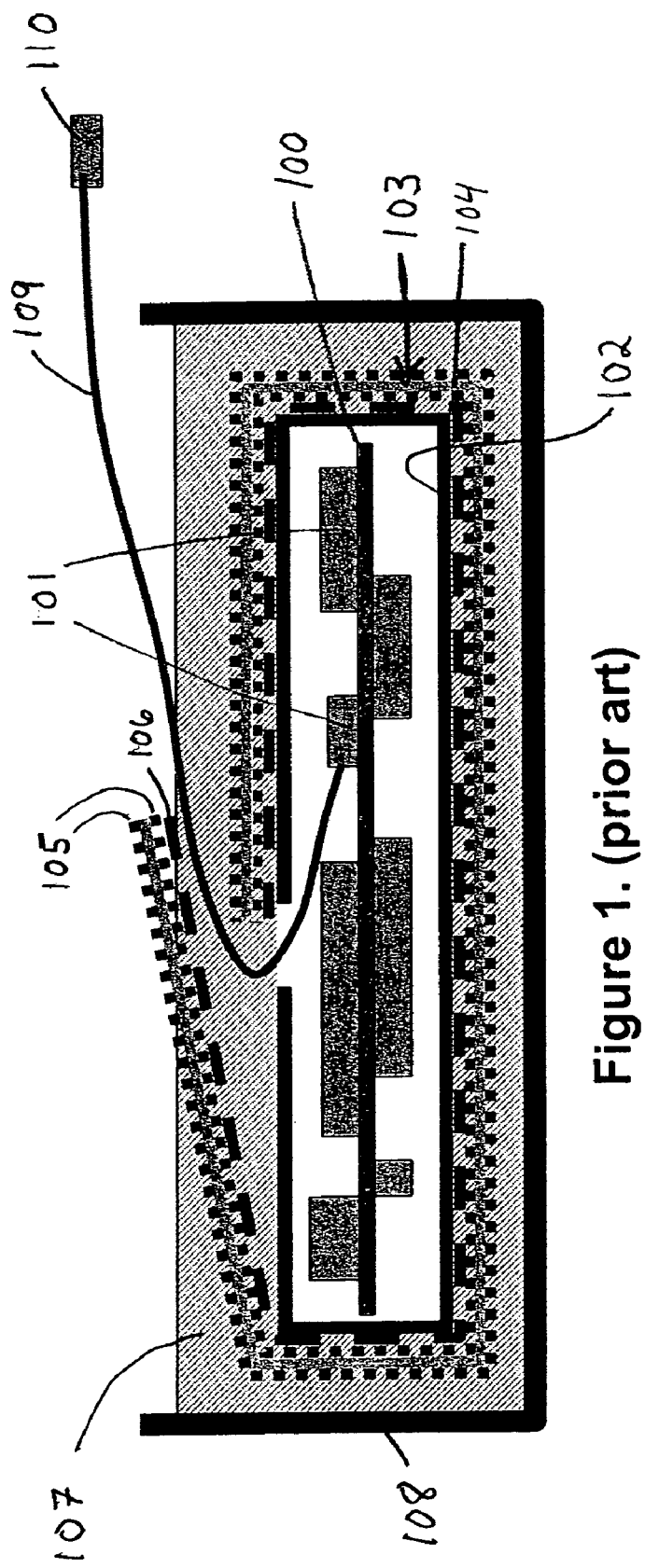
FIG. 1 is a schematic side sectional view of a prior art sensor.

FIG. 1 is a schematic diagram of a prior art tamper respondent enclosure. Circuit board 100 has components 101 disposed thereon. Components 101 contain the sensitive information that is desired to be protected. A box or enclosure 102 surrounds circuit board 100 and components 101. Enclosure 102 has a sensor 103 disposed around it. Sensor 103 comprises a clear PET substrate 104. On both sides of PET substrate 104 are disposed printed traces 105. This is a matrix of conductive lines on each side. The lines are disposed in offsetting relation from one side to the other to ensure complete coverage of PET substrate 104. The inside of PET substrate 104 also has a layer of adhesive 106 disposed over the printed trace 105 on that surface. Adhesive layer 106 is a pressure sensitive adhesive (PSA). In this prior art device, the entire sensor is then encapsulated in an opaque encapsulant or potting material 107. Potting material 107 helps obfuscate printed traces 105. An outer shell 108 surrounds the device. A cable 109 is used to connect components 101 with exterior components 110. Although the top section of sensor 103 is shown to be open, this is for illustration purposes only. In use, the overlapping ends of sensor 103 are secured to one another by adhesive layer 106.

Although this device is effective, it is difficult to manufacture. It includes the deposition of printed traces on two sides of the PET substrate and it also includes the potting layer 107.

Figure 2A:
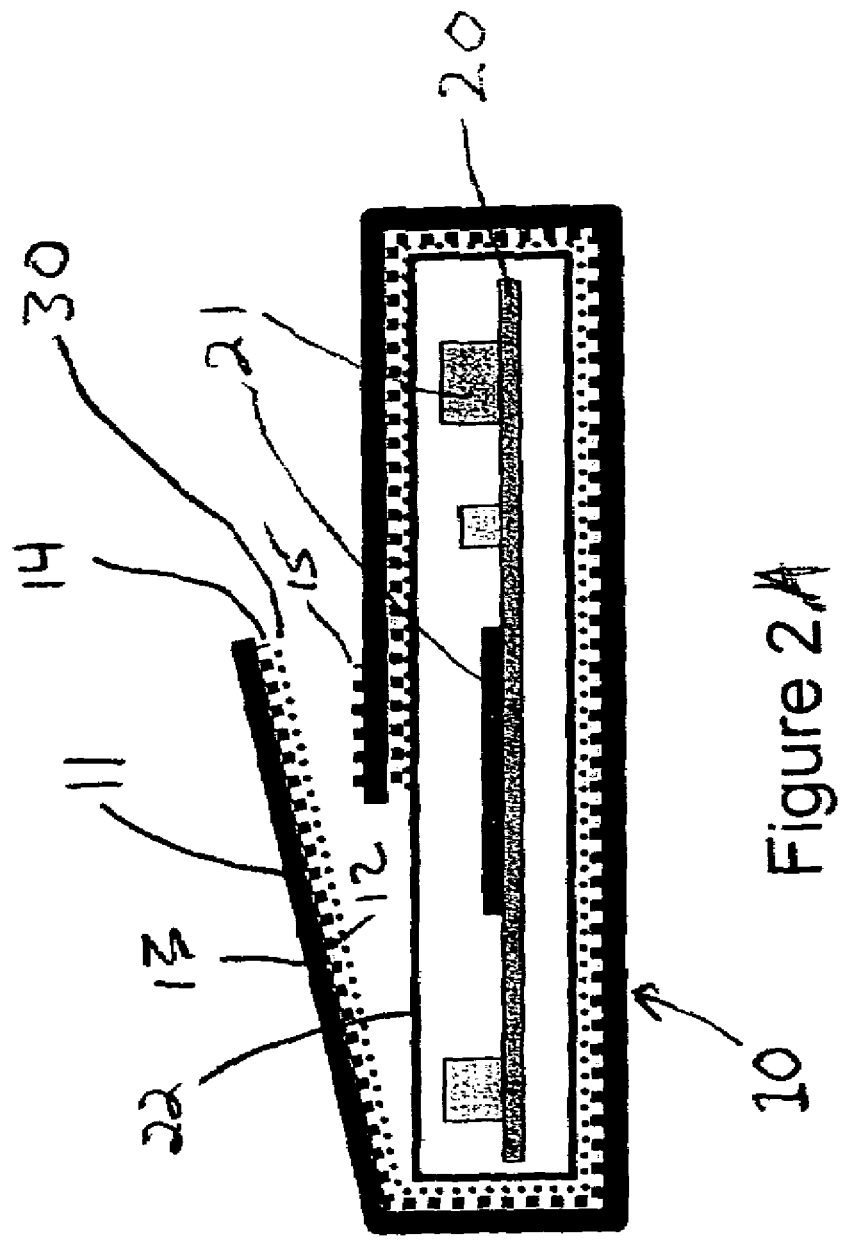
FIG. 2A is a schematic side sectional view of a sensor according to an exemplary embodiment of the present invention.

FIG. 2A is a schematic representation of an exemplary embodiment of the present invention. As shown in FIG. 2, a circuit board 20 has components 21 disposed thereon. Components 21 contain sensitive information to be protected. In alternative embodiments, circuit board 20 can include wireless transmitters as components 21. Circuit board 20 and components 21 are enclosed by a box or enclosure 22. Enclosure 22 may be any shape. A rectangular shape is shown in this embodiment, but it may also be trapezoidal, wedge-shaped, or any other shape. Enclosure 22 is encapsulated by tamper respondent sensor 10. In alternative embodiments, tamper respondent sensor 10 may be wrapped around a circuit board without a preexisting box or enclosure, in which case a filler may be used to form a surface over the circuit board to which tamper respondent sensor 10 adheres.

Tamper respondent sensor 10 includes a substrate 11. Preferably, substrate 11 an insulating material such as PET. According to this invention, substrate 11 is opaque. By using an opaque PET for substrate 11, it is not necessary to subsequently pot the material in order to obfuscate the printed traces.

Substrate 11 has a first side 12 and second side 13. First side 12 is the inside of the substrate as illustrated in FIG. 2A. Disposed on this first side 12 is a first layer of conductive traces 14. Preferably, the conductive traces are made of a conductive, non-metallic ink, such as carbon-loaded polymer resin as taught, for example, in U.S. Pat. No. 5,539,379. Other materials known in the art may be used for the traces.

Substrate 11 is adapted to be folded to produce an overlapping portion of first side 12 with an overlapping portion of second side 13. On second side 13, which is the outer side of substrate 11 in the illustrated embodiment, a second layer of conductive traces 15 is disposed. Second layer of conductive traces 15 is present, however, only at the overlapping portion of second side 13. That is, second layer of conductive traces 15 is only disposed on that portion of second side 13 where there is an overlap with first side 12. The remainder of second side 13 is a region free of conductive traces. Thus, there are no exposed traces on second side 13.

The traces on second side 13 are electrically connected to the traces on first side 12, for example by a via. Preferably, the vias are located at the overlapping portion. A monitor (not shown) detects the circuit completed by first layer of conductive traces 14 and second layer of conductive traces 15 and monitors the electrical state. If this electrical state changes, indicating that the circuit has been broken, for example by cutting one of the traces, the monitor can trigger a response such as erasing information stored in components 21.

As shown in FIG. 2A, the overlap region is open for purposes of illustration. In use, the overlap is mated such that second layer of conductive traces 15 is adhered to first layer of conductive traces 14 by an adhesive layer 30. Adhesive layer 30 is preferably a tackifier, such as a PSA. Adhesive layer 30 is disposed on first side 12 of substrate 11 on the first layer of conductive traces 14. In this manner, once mated, if someone tries to tamper with sensor 10, by lifting substrate 11 at the overlap, adhesive layer 30 will sever either first layer of conductive traces 14 or second layer of conductive traces 15, thereby causing an interruption in the signal and triggering erasure or other protection of information stored in components 21 as described above. There may be one or a plurality of overlap regions of sensor 10 in final use. Preferably there are only two layers of substrate 11 at each overlap region.

As shown in FIG. 2B, a cable 71 is used to connect components inside the device to components outside the device.

Figure 3B:
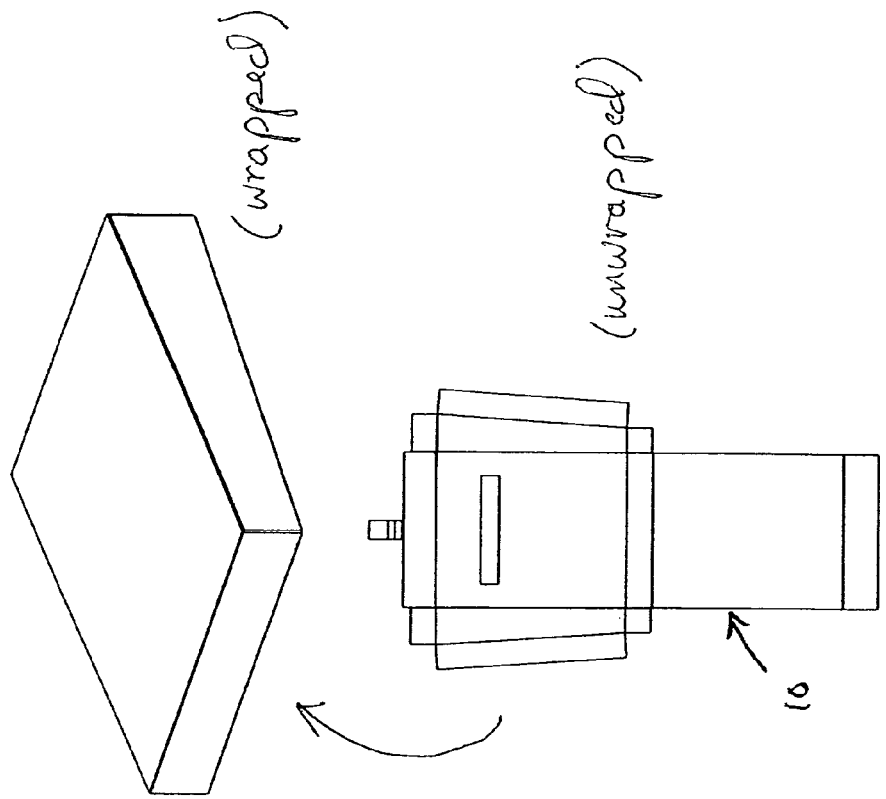
FIG. 3B is a schematic showing an exemplary sensor of the present invention in an unwrapped and a wrapped state.
Figure 3A:
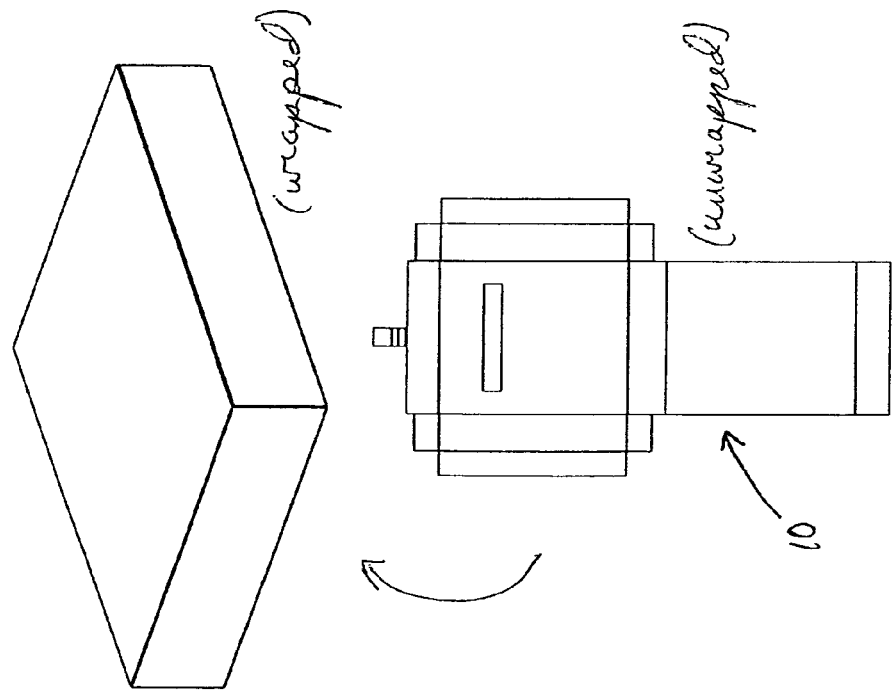
FIG. 3A is a schematic showing an exemplary sensor according to the present invention in an unwrapped and a wrapped state.

FIG. 3A and FIG. 3B show alternative embodiments of the present invention. The embodiments represents a sensor 10 for use in wrapping an enclosure of a rectangular shape (FIG. 3A) and a wedge shape (FIG. 3B). The portion of FIGS. 3A and 3B labeled "unwrapped" shows sensor 10 in its intermediate form. Once an enclosure is placed on sensor 10, sensor 10 is then wrapped around the enclosure to completely encapsulate it, as illustrated in the portion of the figures labeled "wrapped."

FIG. 4A is a bottom view of an exemplary sensor 10 according to the present invention. FIG. 4B is a top view of sensor 10. As shown in FIGS. 4A and 4B, sensor 10 includes substrate 11. In the present invention, substrate 11 is an opaque film such as PET. First side 12 of substrate 11 has first layer of conductive traces 14 disposed thereon.

In a preferred embodiment of the present invention, traces 14 are disposed in an unpredictable pattern on substrate 11. This is in contrast to diagonal (zig-zag), straight, or sinusoidal wave trace lines known in the art. Because these known patterns repeat at regular intervals, it potentially makes the sensor vulnerable to a jumper attack wherein the attacker can locate two points of the same trace and bypass the trace with a conductive jumper. Potentially, the attacker can then penetrate the sensor without triggering a change in electrical state. By using an unpredictable pattern, it is more difficult to break into sensor 10 because it is difficult to follow a single conductive trace and bypass it with a jumper. In order to make the unpredictable pattern, the trace herein is manually drawn using computer-aided software packages such as PCB-PADS®, from Mentor Graphics, a printed circuit board layout software program.

As shown in FIG. 4A, a second layer of conductive traces 15 is disposed on the portions of second side 13 of substrate 11 that will overlap with first side 12 as described above. The remainder of second side 13 is a region free of conductive traces. Thus, there are no exposed traces on second side 13 once it is wrapped around an enclosure.

Figure 5:
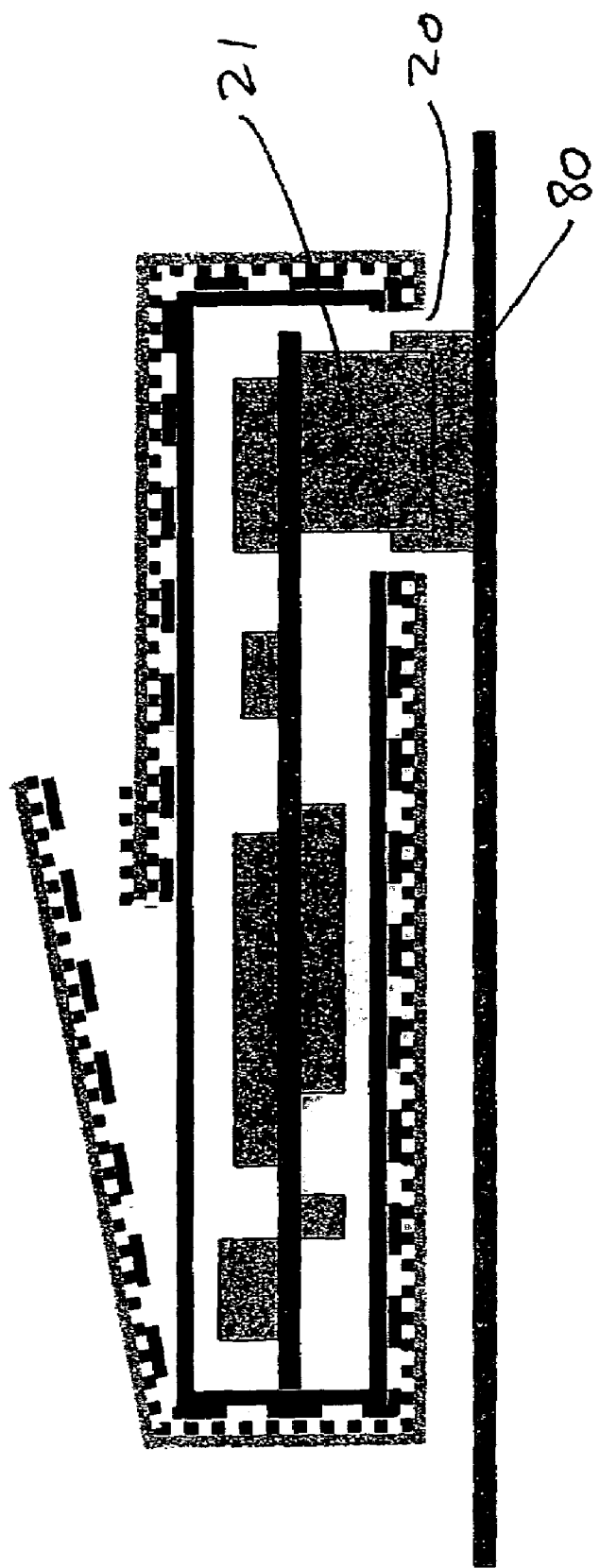
FIG. 5 is a schematic side sectional view of a sensor according to an exemplary embodiment of the present invention.
Figure 6:
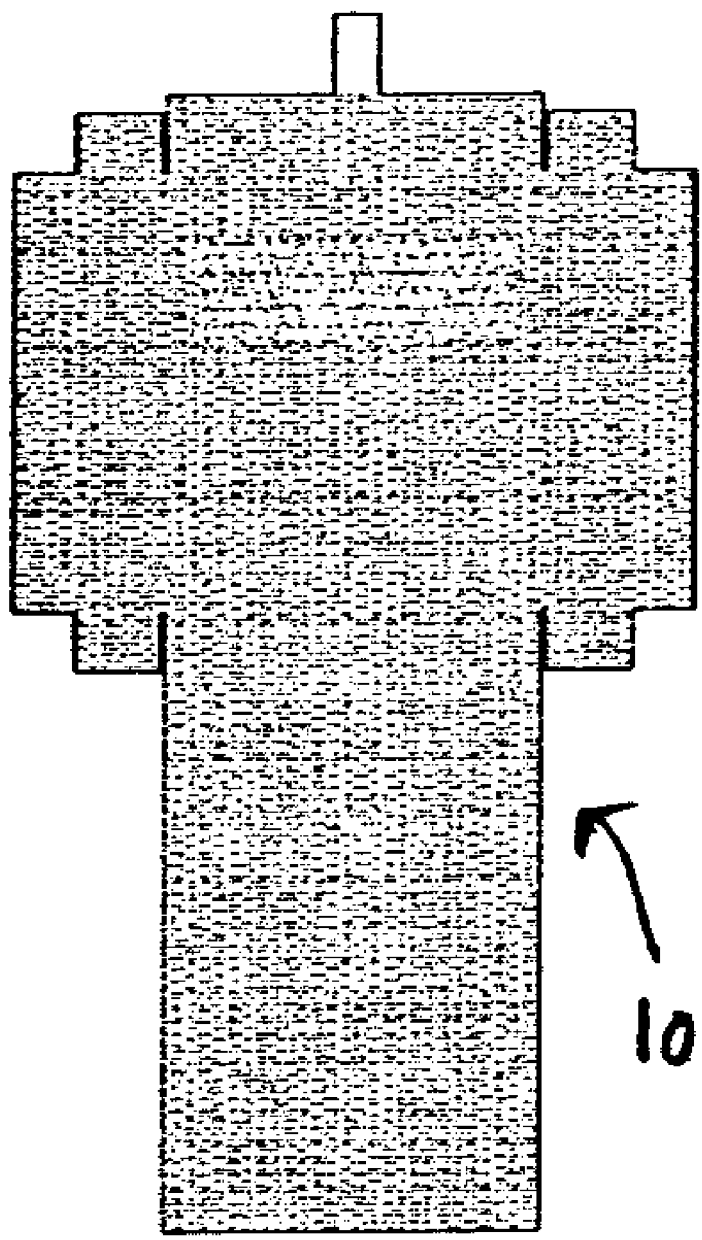
FIG. 6 is a top view of an exemplary sensor according to the present invention.

Also shown in FIGS. 4A and 4B is an opening 20 in sensor 10 which is preferably included in sensor 10 to allow mating of a circuit board 20 with another device external to sensor 10. The external device can be a computer mother board, a connector, or a cable, for example. FIG. 5 illustrates an exemplary embodiment wherein opening 20 allows mating of component 21 to a connector 80. Also shown in FIGS. 4A and 4B is an I/O lead 40 extending from substrate 11. FIG. 6 is a top view of exemplary sensor 10 without opening 20. This sensor 10 of FIG. 6 would be connected using a cable through the overlap zone as shown in FIG. 2B.

The present invention provides distinctive advantages over the known art. Specifically, employing an unpredictable pattern for the traces makes it more difficult to defeat the device. In addition, using an opaque PET for substrate 11 obviates the need to pot the sensor. This eliminates a processing step, making production more efficient and cost effective. It also provides natural obfuscation for the conductive traces which may render the use of a second layer of conductive traces over the entire second side 13 of substrate 11 unnecessary. This also eliminates processing steps increasing efficiency and reducing costs. By selectively putting the second layer of conductive traces 15 only at portions of the second side 13 where substrate 11 overlaps, an effective tamper respondent enclosure is produced.

In the illustrated embodiments, relatively small overlapping portions are depicted. In alternative embodiments, larger overlapping portions are used, for example covering an entire side of box 22 or furthermore all sides of a box.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An article comprising:
   (a) a circuit board;
   (b) a tamper respondent sensor having
      (i) a substrate with first and second sides;
      (ii) a first layer of conductive traces on said first side;
   (c) wherein said tamper respondent sensor has a first unwrapped form having an irregular, non-rectangular shape, and a second wrapped form, wrapped around said circuit board with at least one overlap region;
   (d) wherein only at said at least one overlap region said tamper respondent sensor has a second layer of conductive traces on said second side.

2. An article as defined in claim 1, wherein said substrate is an opaque insulating film.

3. An article as defined in claim 1, wherein said substrate is PET.

4. An article as defined in claim 1, wherein said first layer is adjacent the circuit board.

5. An article as defined in claim 1, wherein said substrate further comprises an opening for communication between said circuit board and an external device.

6. An article as defined in claim 5, wherein said external device is a printed circuit board.

7. An article as defined in claim 5, further comprising a connector attached to said circuit board and disposed in said opening.

8. An article as defined in claim 5, further comprising a cable attached to said circuit board and disposed in said opening.

9. An article as defined in claim 1, wherein said circuit board further comprises a wireless transmitter.

10. An article as defined in claim 1, wherein said tamper respondent sensor is shaped such that there are only two layers of substrate at said at least one overlap region.

11. A tamper respondent sensor as defined in claim 1, wherein said second side of said substrate has no exposed conductive traces.

12. A tamper respondent sensor as defined in claim 1, wherein said substrate further comprises an adhesive.

13. A tamper respondent sensor as defined in claim 12, wherein said adhesive is disposed over either said first layer or said second layer of conductive traces 14.

14. A tamper respondent sensor as defined in claim 12, wherein said adhesive is a PSA.

15. A tamper respondent sensor comprising:
   (a) a substrate having a first side and a second side, said substrate having a first unwrapped form having an irregular, non-rectangular shape, and a second wrapped form, folded to produce an overlapping portion of said first side with an overlapping portion of said second side;
   (b) a first layer of conductive traces on said first side;
   (c) a second layer of conductive traces only at said overlapping portion of said second side,
   (d) said second side having a region free of conductive traces,
   (e) said second layer of conductive traces electrically connected to said first layer of conductive traces.

16. A tamper respondent sensor as defined in claim 15, wherein said substrate is opaque.

17. A tamper respondent sensor as defined in claim 15, wherein said substrate is insulating.

18. A tamper respondent sensor as defined in claim 15, wherein said substrate is PET.

19. A tamper respondent sensor as defined in claim 15, wherein said substrate further comprises an adhesive.

20. A tamper respondent sensor as defined in claim 19, wherein said adhesive is disposed over said first layer of conductive traces.

21. A tamper respondent sensor as defined in claim 19, wherein said adhesive is a PSA.

22. A tamper respondent sensor as defined in claim 15, further comprising an opening.

23. A tamper respondent sensor as defined in claim 15, wherein said traces are in an unpredictable pattern.

24. A tamper respondent sensor as defined in claim 15 further comprising an I/O lead.

25. A tamper respondent sensor as defined in claim 15 further comprising at least one via through said substrate at said overlapping portion connecting said first layer of conductive traces to said second layer of conductive traces.

* * * * *